W.C. ROCKWELL,
V.F. KAUFMAN, E. LOWE
INVENTORS

3,303,578
CONTINUOUS FREEZE-DRYING APPARATUS
William C. Rockwell, El Cerrito, Vern F. Kaufman, Lafayette, and Edison Lowe, El Cerrito, Calif., assignors to the United States of America as represented by the Secretary of Agriculture
Filed July 29, 1964, Ser. No. 386,096
4 Claims. (Cl. 34—182)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel apparatus for conducting freeze-drying on a continuous basis. Other objects of the invention will be evident from the following description.

Figure 1:
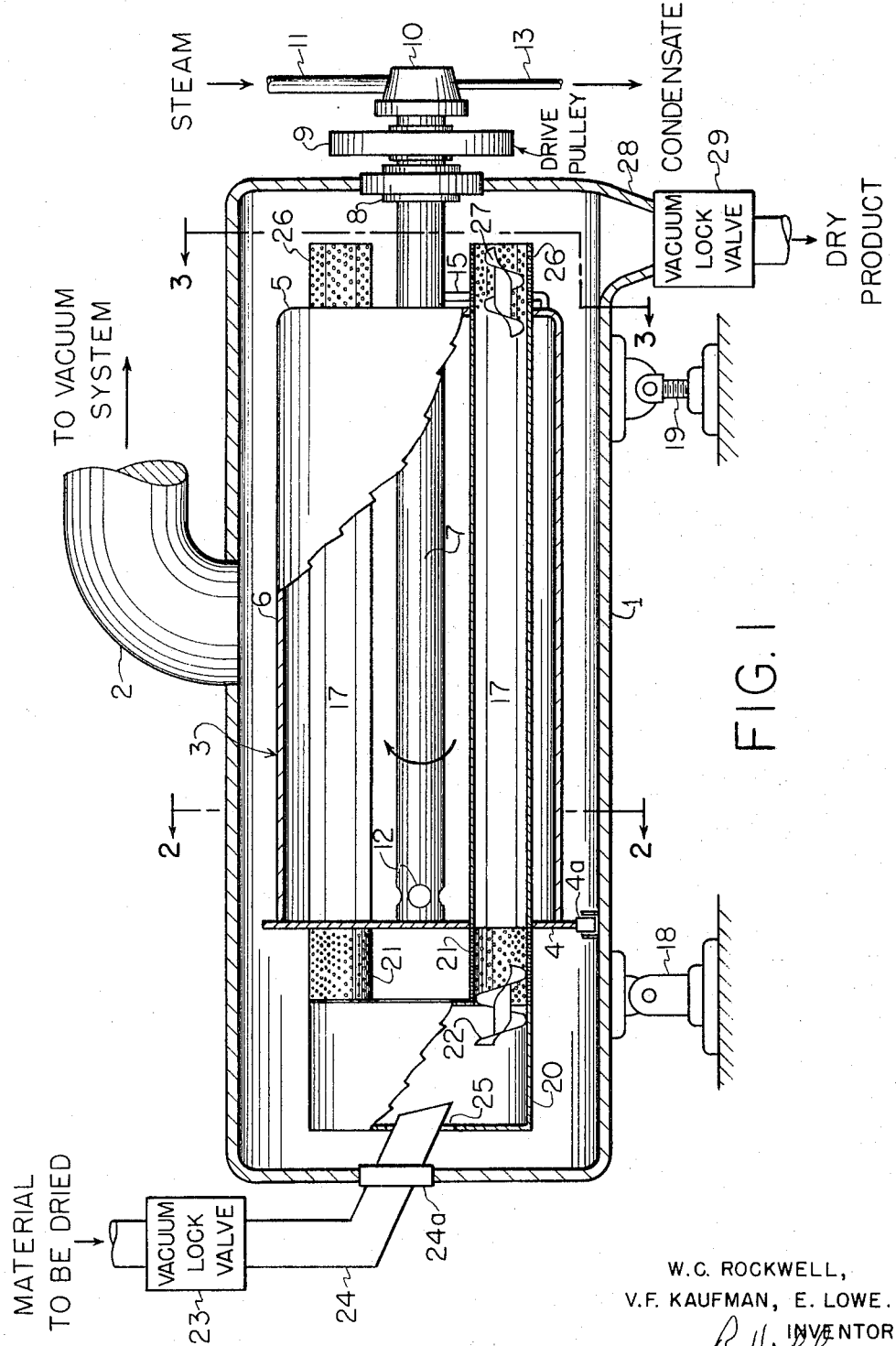
Figure 2:
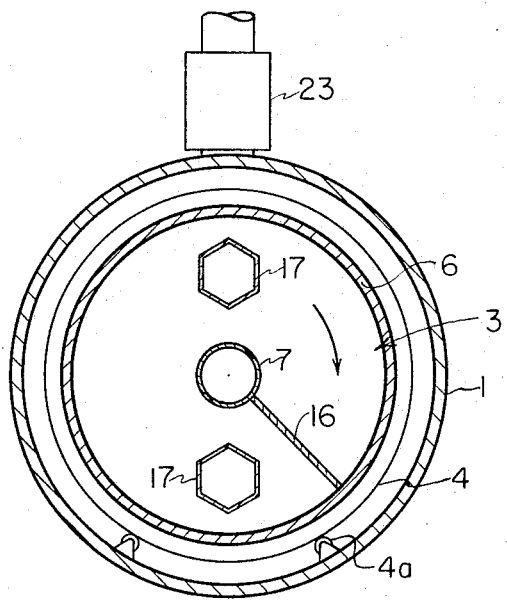
Figure 3:
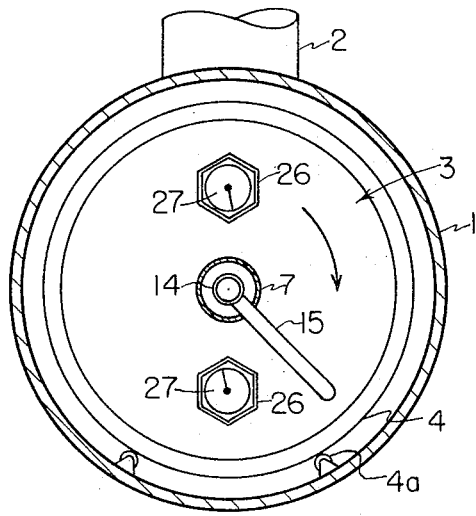

In the annexed drawing, FIGURE 1 is a side view of the drier of the invention, portions of the drier being cut away for clarity of representation. FIGURE 2 is a cross-section on plane 2—2 of FIGURE 1. FIGURE 3 is a cross-section on plane 3—3 of FIGURE 1.

The dehydration procedure generally designated as freeze-drying involves the following basic technique: The material to be treated is frozen and while in such a frozen state is subjected to vacuum. Under these conditions, the ice in the material sublimes, that is, it is transformed directly into water vapor. The evolved water vapor is removed by the vacuum system whereby the sublimation process continues until the material is dehydrated. Since the process of sublimation causes an absorption of heat, the temperature of the material would ordinarily decrease to such a low level that the rate of sublimation would be too low for practical purposes. Accordingly, it is conventioal to apply heat during the process to supply the heat of sublimation.

Generally, freeze-drying is conducted by a batch technique utilizing a conventional vacuum drier of the shelf type. Such driers include a sturdy cabinet provided with a door which may be sealed to a vacuum-tight condition. Within the cabinet are a series of hollow shelves through which a suitable heating medium such as steam or hot water may be circulated. In operation, the material to be dehydrated—for example, peas, strawberries, chicken pieces, etc.—are placed on trays and frozen. The trays of frozen material are then placed between the shelves of the drier, the door closed, and the interior of the cabinet evacuated. Heat is applied to the hollow shelves and the system is maintained under the appropriate conditions of vacuum and applied heat until the product is dehydrated. The freeze-drying procedure has certain advantages which render it desirable for dehydration of foods. Notable among these is that the products retain their original size and shape because the materials are held frozen while being dried and the products have a porous texture so that they can be readily rehydrated. Another item is that there is a marked reduction in damage to such properties as flavor and color as compared with air-drying procedures.

Although the freeze-drying technique involves certain advantages, it is also subject to certain disadvantages. A primary area of concern is the slowness of the process. For example, dehydrating a batch of peas by freeze-drying will take anywhere from 2½ to 6 times as long as dehydrating the same produce in a current of hot air. Another problem is non-uniformity of dehydration. In the conventional shelf-type drier the material adjacent to the heated shelves loses moisture at a much faster rate than material which is isolated from the shelf, for instance, by a layer of the material under treatment. As a result, some portions of the product will be properly dehydrated (or even over-dehydrated or heat damaged) while other portions of the product will be inadequately dehydrated and may even contain ice in the centers of the pieces of material.

The device of the present invention obviates these disadvantages of the known procedures and apparatus. Some of the particular advantages of the device of the invention are listed below:

(1) Material is dehydrated on a continuous basis with resulting efficiency and economy of operation.

(2) The material is dehydrated uniformly. There are no areas of under- or over-dehydration in the product.

(3) The material is handled gently. There is no exposure to undue mechanical stresses—so that the pieces of material retain their size and shape.

(4) A heated surface is provided and all surfaces of the material are contacted therewith by applying a tumbling action to the pieces of material. As a result, the dehydration is effected efficiently, i.e., water is removed from the material at a very rapid rate yet without damage to the properties of the material.

The apparatus of the invention is described in detail below, having reference to the annexed drawings:

The drier includes cylindrical shell 1 of vacuum-tight construction supported on articulated footing 18 and adjustable post 19. By adjustment of the latter, the entire drier is maintained with a slope toward the right-hand end, i.e., the right-hand end is lower than the left-hand end. This slope is required to facilitate progression of the material through the drying tubes hereinafter described. Generally, a slope of about ⅛ to 2 inches per foot is used.

Conduit 2 is connected to a source of vacuum such as a conventional steam ejector whereby the interior of shell 1 is continuously maintained under vacuum.

Within shell 1 is mounted a rotatable steam drum, generally designated as 3, formed of end walls 4 and 5 and cylindrical wall 6. Drum 3 is fabricated so that it is gas-tight; it has no point of communication with the atmosphere in shell 1 surrounding it. Thus, drum 3 may be filled with steam or other heating medium without affecting the vacuum in shell 1.

To rotate drum 3 and provide steam therein, there is provided the following equipment: Hollow shaft 7, fastened to end walls 4 and 5, extends through drum 3, then passes to the exterior via vacuum-tight seal 8. Pulley 9 is keyed to shaft 7 and by rotation of this pulley, using conventional means, the steam drum and associated equipment are rotated at a slow speed, for example, about 0.1 to 3 r.p.m. The type of rotation may be continuous or, preferably, one may employ a drive means which delivers an intermittent or stop-go type of rotation. This imparts a jarring motion and minimizes lodgment of particles in the drying system. The end wall 4 of drum 3 runs on trunnions 4a to provide adequate support. At the extreme right end of shaft 7 is provided a conventional rotary joint 10 which permits connection of stationary supply and discharge conduits to rotating shaft 7. Steam is conducted from inlet pipe 11 via rotary joint 10, shaft 7, and ports 12 into the interior of drum 3. For removing condensate, rotary joint 10 is provided with a condensate outlet 13 which is connected to concentric pipe 14. This, in turn, communicates with the interior of drum 3 via radial pipe 15 (see FIGURE 3). A longitudinal partition 16 within drum 3 is provided to assist in segregating condensate at the base of the drum, from where it can be blown out via pipes 15, 14, and 13. Pipe 13 is provided with a conventional steam trap (not illustrated) to prevent loss of steam.

There are provided a plurality of drying tubes 17 extending through drum 3, each of which are open to the vacuum within shell 1. (For purpose of simplifying the drawing, only two of the tubes 17 are depicted.) Most of the drying takes place in these tubes. Thus in operation, the material is conveyed by these tubes from the feed (left) end of the device to the discharge (right) end of the device while exposing the material to heat transferred from the steam about the tubes, while exposing it to vacuum and while continuously tumbling the material so that all surfaces thereof are given a uniform exposure to heat and vacuum. An important feature of drying tubes 17 is that they are polygonal in cross section (see FIGURE 2). With such a construction the material is subjected to positive tumbling action as the material rolls from one face of the polygon to another. This means that all surfaces of the pieces of material are uniformly exposed to the heated walls of the drying tubes. On the other hand, were one to use a tube of circular cross-section, the material would tend to slide without any relative motion of the individual pieces with the result that non-uniform dehydration would take place. It is also to be observed that the polygonal configuration not only causes the desired tumbling action but also presents a smooth surface to the material being treated. Thereby the tumbling is achieved with a minimum of mechanical damage to the size and shape of the pieces of material being treated. Moreover, the smooth surfaces can be cleaned easily and present no crevices or protrusions on which material might lodge. Another feature of the drying tubes is that they are long and narrow, thereby providing a high ratio of heat transfer surface to weight of material being dried. Such high ratio is desirable as providing a high rate of moisture evaporation. Were one to use a wide, short tube a great deal of the material would be remote from the heated surfaces, with the result that the ratio of heating surface to material weight would be low and hence the efficiency of evaporation would be low. In the device of the invention, it is preferred that the length of the drying tubes be at least 10, preferably 15 to 25, times the diameter thereby to achieve the desired efficiency.

At the left-hand end of shell 1 there is provided a feed cylinder 20 and perforated cylindrical feed tubes 21 leading to drying tubes 17. Cylinder 20 and tubes 21 are fastened to drum 3 and rotate as a unit therewith. Tubes 21 are perforated to provide adequate freedom of passage for vapors from drying tubes 17 into the interior of shell 1 and eventually to conduit 2. Each of the feed tubes 21 is provided with a feed screw 22 fixed rigidly to the tube.

In operation, the material to be dried is fed through a conventional vacuum lock valve 23 into chute 24. This chute extends into shell 1 through vacuum-tight static seal 24a and into feed cylinder 20 through circular opening 25 in the end wall of cylinder 20. The entering material is thus directed by chute 24 into cylinder 20. Usually, the material is introduced at such a rate as to continuously maintain a bed of material in cylinder 20, this bed extending almost up to the lower lip of opening 25. Because of the circular wall of cylinder 20, this bed of material remains at the base of the cylinder. Then as each feed tube 21 moves through the lower point of its orbit, the feed screw 22 associated therewith moves through the bed of material and scoops up a quantity of material which is then advanced by the screw into feed tube 21 and eventually into drying tube 17. It is to be observed that although there is no relative motion between each screw 22 and each feed tube 21, there is obtained a rotation of each screw 22 as it revolves (or orbits) together with the rest of the assembly around the axis presented by shaft 7. It is this rotational effect which makes the feed screws 22 operative so that the material is continuously fed into each drying tube. Such items as the pitch of the feed screws 22, the speed of rotation of shaft 7, the rate of introducing material into the drier, the slope of the entire drier, etc. are so correlated that drying tubes 17 are continuously maintained about ⅓ to ⅔ full of material. It is, of course, obvious that the direction of rotation of shaft 7 and the direction of twist of feed screws 22 are so correlated that the material is impelled in the direction from cylinder 20 toward tubes 17.

To maintain tubes 17 filled to the desired degree there is provided a weir arrangement at the discharge (right-hand) end of the system. Thus each of the drying tubes 17 is provided with a discharge tube 26 of polygonal cross-section, fabricated from perforated sheet material to provide free passage of vapors from drying tubes 17. Rigidly fastened in each of these discharge tubes is a discharge screw 27. It is to be observed that the direction of twist of these screws is the opposite of that of feed screws 22. Thus with a standard selected direction of rotation of drum 3 and associated parts, feed screws 22 are selected to impel material toward the right, whereas discharge screws 27 are selected to impel material to the left and thus act as weirs to restrain free discharge of material from drying tubes 17 and thus cooperate to keep drying tubes 17 filled to the desired level. (It has been observed that without the weir effect of discharge screws 27, the bed of material in the drying tube thins down very markedly at discharge ends of the tubes. As a result, the material is not held along enough in this area to take full advantage of the drying conditions. Where the weir is used, the retardation effect thereof insures that the level of material is maintained even at the discharge end of the tubes with the result that the entire length of each drying tube is used effectively in removal of moisture from the material.) Naturally, screws 27 are not intended to completely block passage of material and are selected with appropriate dimensions—taking into account such factors as pitch and length of the screw and the degree of slope of the drying system—so that the net result is a continuous maintenance of a bed of the desired depth in the drying tubes and the continuous passage of the excess through the discharge screws as the dried product. It may be noted that although discharge screws 27 are rigidly mounted in tubes 26, they are operative by reason of the fact that they orbit about the axis of shaft 7 with rotation of drum 3 and thus, in effect, each turn of the drum 3 provides a turn of each of the discharge screws 27. Discharge tubes 26 and the associated discharge screws 27 serve another useful function, as follows: As the material passes through drying tubes 17 its moisture content is progressively reduced and hence the cooling effect of sublimation is correspondingly decreased. Accordingly, a situation may occur wherein if the entire dehydration is accomplished within the drying tubes, the material may become overheated as it passes through the last part of the drying tubes. By providing the construction disclosed, such overheating cannot take place; the last part of the dehydration is accomplished in the discharge tubes 26 wherein the material is no longer in contact with the hot surfaces of tubes 17. It is obvious that the length of discharge tubes 26 can be altered to provide a greater or lesser degree of this final drying with a decreased exposure to heat. For example, by making the discharge tubes longer the material will remain therein for a longer period and hence the duration of this final drying will be extended.

The product which flows from the ends of discharge tubes 26 is removed from the drier system via discharge chute 28 and vacuum lock valve 29.

An additional advantage of using screws 27 as the discharge weirs is that at the end of a run, the system can be readily empted of all material still in the drying tubes 17. This is accomplished by reversing the direction of rotation whereby screws 27 will positively impel the residual material into discharge hopper 28.

To minimize sticking of particles to the apparatus, it is preferred that the structure which comes into contact with the material being dried—particularly the inner surface of drying tubes 17—be coated with a fluorocarbon resin, for example, polytetrafluoroethylene.

The apparatus of the invention can be employed for the dehydration of any particulate material. Typical examples of such materials are peas, berries, grapes, diced fruits, vegetables, or meats, etc. As customary in freeze-drying processes, these materials are first frozen, then applied to the device while in the frozen state. Also, because of the solidifying effect of freezing, the device may be used for dehydration of liquid materials such as juices, extracts, purees, or concentrates derived from fruits, vegetables, meats, or cereals; milk; eggs; etc. In such applications the liquid, raw material is frozen in the form of globules, pellets, dice or other apropriate particles and applied as such to the drier.

The invention is further demonstrated by the following illustrative example:

The drier used in this run was essentially as described above except that there was only one drying tube 17. It was 8 feet long, hexagonal in cross-section, internal diameter 7½ inches (or about 6½ inches measured across the flat). Steam was introduced under pressure into the steam drum to maintain the drying tube walls at 250° F. Speed of rotation of the drum and tube assembly was 1.7 r.p.m., the slope was 3/16 inch per foot.

The starting material was ⅜ inch diced, frozen chicken meat, having a moisture content of 65%. It was fed into the system at the rate of 10 lbs. per hour. Retention time in the drying tube was calculated to be 2.5 hours. The product, having a moisture content of 2%, was produced at the rate of 3.6 lbs. per hour. The diced form of the chicken meat was retained in the product and taste tests indicated there was no damage to flavor. Also, because of the porous texture of the product, it absorbed water very rapidly on being reconstituted.

It was calculated that the drying efficiency was 0.43 lb. of water evaporated per hour per square foot of heat transfer surface. This is four times the efficiency obtained in the conventional shelf-type vacuum driers.

Having thus described the invention, what is claimed is:

1. A drier comprising, in combination, a shell defining a gas-tight enclosure, means for evacuating the interior of the shell to maintain a vacuum therein, an elongated drying tube of polygonal cross-section within the shell, means for rotating the drying tube, means for heating the drying tube, means for feeding frozen food to be dried into one end of said drying tube at a predetermined rate, a discharge screw within the drying tube at the other end thereof and having a direction of twist opposing the feeding movement of material in said tube, said screw acting as a weir to regulate the rate of discharge of dried material from said tube, and means for removing the product discharged through said screw.

2. A drier comprising, in combination, a shell defining a gas-tight enclosure, means for evacuating the interior of the shell to maintain a vacuum therein, an elongated drying tube of polygonal cross-section within the shell, said drying tube providing the means for conveying material therethrough with a tumbling action while exposing it to heat and vacuum, means for rotating the drying tube, means for heating the drying tube, means for feeding material to be dried into one end of the drying tube at a predetermined rate, a perforated tube connected coaxially at the other end of the drying tube for receiving material discharged from the drying tube and for exposing said discharged material to vacuum and to a lesser degree of heat than it would be if retained in said drying tube, a weir mounted in said perforated tube for restricting discharge of material and for maintaining a bed of material of predetermined depth throughout the length of the drying tube and perforated tube, and means for removing product discharged through said weir.

3. A drier comprising, in combination, a shell defining a gas-tight enclosure, means for evacuating the interior of the shell to maintain a vacuum therein, an elongated drying tube of polygonal cross-section within said shell and having a feed end and a discharge end, the said drying tube being mounted at a slope from the horizontal so that the discharge end is lower than the feed end, said drying tube providing the means for conveying material therethrough with a tumbling action while exposing it to heat and vacuum, means for rotating the drying tube, means for heating the drying tube, a feed screw mounted adjacent to the feed end of the drying tube and operative by the rotation of the drying tube to feed material thereinto at a predetermined rate, a perforated tube connected coaxially to the discharge end of the drying tube for receiving material discharged from the drying tube and for exposing said material to vacuum and to a lesser degree of heat than it would be if retained in said drying tube, a discharge screw mounted in said perforated tube and having a direction of twist opposite to that of the aforesaid feed screw, said discharge screw acting as a weir to restrict discharge of material from said perforated tube and to maintain a bed of material of predetermined depth throughout the length of the drying tube and the perforated tube, and means for removing product discharged past said discharge screw.

4. A drier comprising, in combination, a shell defining a gas-tight enclosure, means for evacuating the interior of the shell to maintain a vacuum therein, a cylindrical heating drum mounted for rotation within said shell, means for circulating a heating medium through said drum, means for rotating said drum, a plurality of drying tubes extending through said drum, each drying tube being of polygonal cross-section and extending parallel to the axis of the drum, each of said drying tubes providing the means for conveying material therethrough with a tumbling action while exposing it to heat transferred thereto from the heating medium within the drum and to the vacuum existing within the shell, a reservoir for material to be dried mounted within the shell, means for feeding material to be dried into said reservoir, means cooperative with said reservoir and drying tubes for feeding material into the drying tubes at a predetermined rate, weir means within each drying tube cooperative with said drying tubes for maintaining a predetermined depth of material in each drying tube, and means for removing the dried product.

References Cited by the Examiner

UNITED STATES PATENTS

| | | | |
|---|---|---|---|
| 1,038,791 | 9/1912 | Richardson | 34—108 |
| 2,348,446 | 5/1944 | Becker | 34—63 X |
| 2,552,835 | 5/1951 | Arnold | 34—128 |
| 2,602,594 | 7/1952 | Hesse | 34—56 X |
| 2,837,831 | 6/1958 | Gates | 34—92 |
| 2,869,743 | 1/1959 | Williams | 302—50 |
| 2,884,229 | 4/1959 | Francis et al. | 34—108 |
| 2,909,114 | 10/1959 | Bok | 34—92 |
| 3,208,512 | 9/1965 | Kalmbach | 165—88 |

FOREIGN PATENTS 231,949  4/1925  Great Britain.

MARTIN P. SCHWADRON, *Primary Examiner.*

FREDERICK L. MATTESON, JR., *Examiner.*

B. L. ADAMS, *Assistant Examiner.*